United States Patent
Daferner

(10) Patent No.: US 7,039,484 B2
(45) Date of Patent: May 2, 2006

(54) PREDICTION OF THE DEGREE OF DELIVERY RELIABILITY IN SERIAL PRODUCTION

(75) Inventor: Martin Daferner, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/532,890

(22) PCT Filed: Sep. 20, 2003

(86) PCT No.: PCT/EP03/10511

§ 371 (c)(1),
(2), (4) Date: Apr. 27, 2005

(87) PCT Pub. No.: WO2004/040483

PCT Pub. Date: May 13, 2004

(65) Prior Publication Data

US 2006/0047354 A1   Mar. 2, 2006

(30) Foreign Application Priority Data

Oct. 29, 2002   (DE) ............................... 102 50 285

(51) Int. Cl.
G06F 19/00   (2006.01)
G05B 13/02   (2006.01)

(52) U.S. Cl. ........................................ 700/108; 700/28

(58) Field of Classification Search ............ 700/28–34, 700/36, 37, 44–46, 51, 108; 705/7–11, 22, 705/28
See application file for complete search history.

(56) References Cited

U.S. PATENT DOCUMENTS

| 5,229,948 | A |   | 7/1993 | Wei et al. .................... 364/468 |
|---|---|---|---|---|
| 5,818,716 | A |   | 10/1998 | Chin et al. ............. 364/468.06 |
| 5,826,040 | A | * | 10/1998 | Fargher et al. ................ 705/8 |
| 5,890,133 | A |   | 3/1999 | Ernst .............................. 705/7 |
| 6,195,590 | B1 |   | 2/2001 | Powell ......................... 700/36 |
| 6,259,959 | B1 |   | 7/2001 | Martin ......................... 700/99 |
| 6,292,784 | B1 | * | 9/2001 | Martin et al. .................. 705/11 |
| 6,463,345 | B1 | * | 10/2002 | Peachey-Kountz et al. ... 700/99 |
| 6,615,097 | B1 | * | 9/2003 | Ozaki .......................... 700/121 |
| 6,684,118 | B1 | * | 1/2004 | Wu et al. ..................... 700/99 |
| 6,853,920 | B1 | * | 2/2005 | Hsiung et al. ................. 702/1 |
| 6,876,948 | B1 | * | 4/2005 | Smith ........................ 702/181 |
| 2002/0174384 | A1 | * | 11/2002 | Graichen et al. ............. 714/37 |
| 2003/0050870 | A1 | * | 3/2003 | Cargille et al. .............. 705/28 |
| 2004/0034555 | A1 | * | 2/2004 | Dismukes et al. ............ 705/7 |
| 2004/0068430 | A1 | * | 4/2004 | Peachey-Kountz et al. ... 705/10 |
| 2004/0138936 | A1 | * | 7/2004 | Johnson et al. ................ 705/7 |
| 2004/0148047 | A1 | * | 7/2004 | Dismukes et al. .......... 700/100 |

FOREIGN PATENT DOCUMENTS

| DE | 195 35 084 | 3/1997 |
|---|---|---|
| DE | 100 62 553 | 6/2002 |
| WO | WO 96/35187 | 11/1996 |
| WO | WO 01/93117 | 12/2001 |

OTHER PUBLICATIONS

Itsuo Hatono et al., Modeling and on-line scheduling of flexible manufacturing systems using stochastic Perti nets, IEEE Transactions on Software Engineering, IEEE Inc., New York, US, vol. 17, No. 2, Feb. 1991, pp. 126-132, ISSN 0098-5589.

* cited by examiner

*Primary Examiner*—Maria N. Von Buhr
(74) *Attorney, Agent, or Firm*—Davidson, Davidson & Kappel, LLC

(57) ABSTRACT

In an exemplary embodiment of the present invention, a method for determining effects of cycle time limitations for sub-processes of a production process for individual units of a technical product is provided. In the method of the exemplary embodiment, there is set: a pre-selected definition of the order of sequence in which the sub-processes of the production process are carried out, a pre-selected planned cycle time through the production process, a pre-selected random sample including individual sample elements of units processed in the production process, each one of the individual sample elements including information on actual cycle times of the corresponding unit through the sub-processes, and a pre-selected maximum cycle time through a pre-selected one of the sub-processes. The method comprises the steps of: for all individual sample elements, replacing the actual corresponding cycle times through the pre-selected one of the sub-processes with pre-selected reduced cycle times set to be equal to or less than the pre-selected maximum cycle time for the pre-selected one of the sub-processes, determining cycle times through the production process, which result from the reduction, for the random sample, using the reduced cycle times for the individual sample elements of the random sample through the pre-selected one of the sub-processes, the actual cycle times of the individual sample elements of the random sample through the remaining sub-processes, and the order of sequence, and determining a degree of delivery reliability of the production process as a proportion of sample elements of the random sample having cycle times that are less than or equal to the planned cycle time through the production process. In addition, the present invention provides a device arrangement, which can comprises a computer having an internal memory, and a computer program product for determining effects that cycle time limitations for sub-processes of a production process have on quality parameters of the production process.

18 Claims, 10 Drawing Sheets

PREDICTION OF THE DEGREE OF DELIVERY RELIABILITY IN SERIAL PRODUCTION

The present invention relates to a method and device for determining effects that cycle time limitations for subprocesses of a production process have on quality parameters of the production process.

BACKGROUND

A preferred field of application of the present invention is the serial production of technical products, such as motor vehicles. Frequently, a unit of the technical product is produced in response to a customer order. The order may include several units. A delivery date is agreed with the customer, the delivery date being the date on which the unit of the technical product ordered by the customer is made available. A final inspection date on which the unit is finished is derived from this delivery date. This final inspection date depends on the actual cycle time of the product through the serial production process. In serial production, the actual cycle time through the production process varies as well, for example, due to differences in quality of supplied parts and because of breakdowns and other unpredictable events. In practice, therefore, it may happen that a final inspection data, and thus, a delivery date for a particular unit of the technical product cannot be met because the actual cycle time is longer than the planned cycle time that formed the basis for the agreed final inspection date. This planned cycle time is often also referred to as the maximum permitted cycle time for a production process. Delivery reliability (on-time delivery) means that a predetermined final inspection date is met. In the following, an order will be referred to as completed on time even if the unit is completed earlier than agreed. The proportion of units of the technical product whose actual cycle times are less than or equal to a specified planned cycle time and whose final inspection dates may therefore be met is referred to as the degree of delivery reliability. In the prior art, the degree of delivery reliability is sometimes also referred to as the degree of on-time delivery.

A serial production process includes a plurality of subprocesses, such as several trades in a vehicle factory. The cycle time through the entire production process depends on the cycle times through the subprocesses. When defining maximum cycle times for the subprocesses, two different objectives must be taken into account:

The highest possible degree of delivery reliability should be achieved since late delivery of units of the technical product may result in penalties.
  The average storage duration for units of the technical product that are completed prior to the final inspection date should be as short as possible since storage binds capital, requires space for the units, and involves the risk of damage to finished units during storage. On the other hand, units that are completed exactly on the final inspection date or later do not require storage.

The two objectives are in conflict with each other because the longer the planned cycle time through the production process the greater is the degree of delivery reliability, but the shorter the cycle time the shorter is the average storage duration.

U.S. Pat. No. 6,259,959 B1 discloses a method and device for determining the impact of components, such as workstations, of a manufacturing line on the performance of the manufacturing line. The X-factor of a component, which is the quotient of the cycle time divided by the raw processing time, is used as a measure of performance. The cycle time is the period that elapses between the instant at which a workpiece reaches the component and the instant at which it leaves the component. The X-factor factor increases significantly with increasing throughput through the manufacturing line. To achieve a given cycle time, it is often necessary to reduce the throughput, which involves costs. Therefore, a compromise must be found between throughput, degree of delivery reliability, capacity, and high utilization of the components. The X-factors and, in one embodiment, the throughput through the production process are used to derive assessments of the components. Optimization measures are directed to components having a low rating.

The method and device of U.S. Pat. No. 6,259,959 B1 require that the raw processing time of each subprocess be measured or otherwise determined. Such results of the measurement of the raw processing time, which is only part of the total cycle time through a subprocess, are frequently not available. Moreover, it is not described how a certain degree of delivery reliability can be maintained.

U.S. Pat. No. 6,195,590 B1 discloses a method and device for monitoring compliance with a schedule for a production process including a plurality of subprocesses. There are specified a desired completion date of the production process, such as a final inspection date, as well as estimated cycle times through the subprocesses, and availabilities of external events that must have occurred for subprocesses to begin. Based on the completion date and the cycles times, desired starting times ("baseline schedule data") are derived for the subprocesses and compared to the target dates of external events. The greatest deviation is determined as well as the subprocess responsible for it. This document does not describe either how a certain degree of delivery reliability can be maintained.

Known from U.S. Pat. No. 5,229,948 is a method of optimizing a serial production process including a plurality of subprocesses ("stages"). A quantitative model of states, implemented, for example, by buffer memories, is established, and the performance of the production process and individual subprocesses is determined by model simulations. When necessary, it is determined which buffer memories need to the changed in order to produce the greatest improvement. The establishment and adaptation of such a model requires considerable effort and is prone to errors.

SUMMARY OF THE INVENTION

The invention provides a method and a device for determining the effects that cycle time limitations for subprocesses have on quality parameters of a production process without requiring an analytical model of the production process and without the need to intervene in the real production process.

In an exemplary embodiment of the present invention, a method for determining effects of cycle time limitations for sub-processes of a production process for individual units of a technical product is provided. In the method of the exemplary embodiment, there is set: a pre-selected definition of the order of sequence in which the sub-processes of the production process are carried out, a pre-selected planned cycle time through the production process, a pre-selected random sample including individual sample elements of units processed in the production process, each one of the individual sample elements including information on actual cycle times of the corresponding unit through the sub-processes, and a pre-selected maximum cycle time through a pre-selected one of the sub-processes. The method comprises the steps of: for all individual sample elements, replacing the actual corresponding cycle times through the pre-selected one of the sub-processes with pre-selected reduced cycle times set to be equal to or less than the pre-selected maximum cycle time for the pre-selected one of the sub-processes, determining cycle times through the production process, which result from the reduction, for the random sample, using the reduced cycle times for the individual sample elements of the random sample through the pre-selected one of the sub-processes, the actual cycle times of the individual sample elements of the random sample through the remaining sub-processes, and the order of sequence, and determining a degree of delivery reliability of the production process as a proportion of sample elements of the random sample having cycle times that are less than or equal to the planned cycle time through the production process. In addition, the present invention provides a device arrangement, which can comprises a computer having an internal memory, and a computer program product for determining effects that cycle time limitations for sub-processes of a production process have on quality parameters of the production process.

The present invention allows automatic determination of the effect of limitations for cycle times through subprocesses. A cycle time limitation, also referred to as maximum cycle time hereinafter, is specified for at least one subprocess. It is possible to specify a limitation for each of a plurality of subprocesses. The method may be used in particular to test the effects of different cycle time limitations for the same subprocess or for different subprocesses in advance without having to make changes to the real production process. Changes to the real production process are often very expensive. Therefore, it pays off to simulate different possible changes on a data processing system, that is, to test and compare them first without intervening in the real production process, and to make real interventions and changes only thereafter. In this manner, it is possible to determine which subprocesses contribute exceptionally to high actual cycle times, and in which subprocesses improvements and investments result in particularly significant improvements. Thus, the method allows identification of effective "adjusting screws", preventing optimization of a wrong subprocess, that is, a subprocess whose improvement contributes little to reducing the cycle time through the entire production process.

The method provides a systematic procedure for establishing reductions and limitations for the cycle time through the subprocesses and for predicting their effects on the degree of delivery reliability and the storage duration, as well as on the inventory. The method yields better results than when specifying, for example, only a maximum inventory, a maximum or a planned cycle time through the entire production process, or a minimum degree of delivery reliability. Rather, a good compromise is found between the competing requirements described above.

Another advantage of the method according to the present invention is that there is no need to definitively define which are the known input variables and which are the output variables to be determined. Rather, it is possible, for example, to optionally specify the maximum cycle time, the minimum degree of delivery reliability and/or the maximum storage duration or inventory, and the remaining parameters can be determined as a function of this information.

The method can be used for sales scheduling, for example, to give the customer of an order a reliable delivery date one which the order will be completed. It can also be used for improvements in individual subprocesses, for example, a continuous improvement process, to predict the effect of improvements, to compare actual with predicted effects, and to identify weak points and errors in the implementation of the improvements at an early point in time. Different possible measures can be predicted and compared early in terms of their costs and effects on parameters of the production process.

The present invention does not need an analytical model of the production process and therefore avoids the above-described disadvantages associated with establishing and maintaining such a model. The random sample used, which includes actual cycle times of units of a technical product produced by the production process, the cycle times being measured in the real production process, is generally available anyway, for example, from production process logs. Each sample element includes the cycle times of this element through each subprocess. Therefore, without any additional effort, the random sample includes information about how the cycle time for a sample element through a subprocess affects the cycle time of the same element through a different subprocess. Therefore, modeling and assumptions about dependencies between subprocesses, such as the condition of independence in the statistical sense, are not needed. Frequently, such assumptions do not hold in practice.

The method may also be used even if the production process and the production facility used therefor do not yet exist in reality. In this case, of course, a model is needed, and the random sample is obtained by a model simulation, preferably Monte-Carlo simulations. The results may be used to plan an entire production facility or a subprocess on a greenfield site and to compare alternatives.

It is also possible to select, as a characteristic for a subprocess, a curve that shows the degree of delivery reliability as a function of the planned cycle time through the production process, and to adapt the production to this characteristic.

In a refinement of the present invention, two different parameters of the production process, namely the degree of delivery reliability and the average storage duration, may be determined using the same random sample. In one refinement of the present invention, the degree of delivery reliability is determined as a function of the planned cycle time. This refinement eliminates the need to definitively define, for example, a degree of delivery reliability or a planned cycle time and to adjust the production process to this fixed input. Rather, the function is illustrated graphically, and an interdisciplinary team can analyze this function and define an operating point, that is, a planned cycle time and the degree of delivery reliability resulting therefrom. Another embodiment provides for such an operating point to be selected automatically. The function increases monotonously because a longer planned cycle time results in a greater or at least equal degree of delivery reliability. Therefore, its slope can be determined at least approximately, and the point where the slope of the function is approximately 45 degrees is selected as the operating point. For longer planned cycle times, the function quickly saturates, so that a longer planned cycle time does indeed result in an increased inventory, but only in a slightly greater degree of delivery reliability. Shorter planned cycle times result in a considerably lower degree of delivery reliability, and are often not achievable.

BRIEF DESCRIPTION OF THE DRAWINGS

The following is a description of a preferred embodiment of the method according to the present invention. In the drawing.

DETAILED DESCRIPTION

Figure 1:
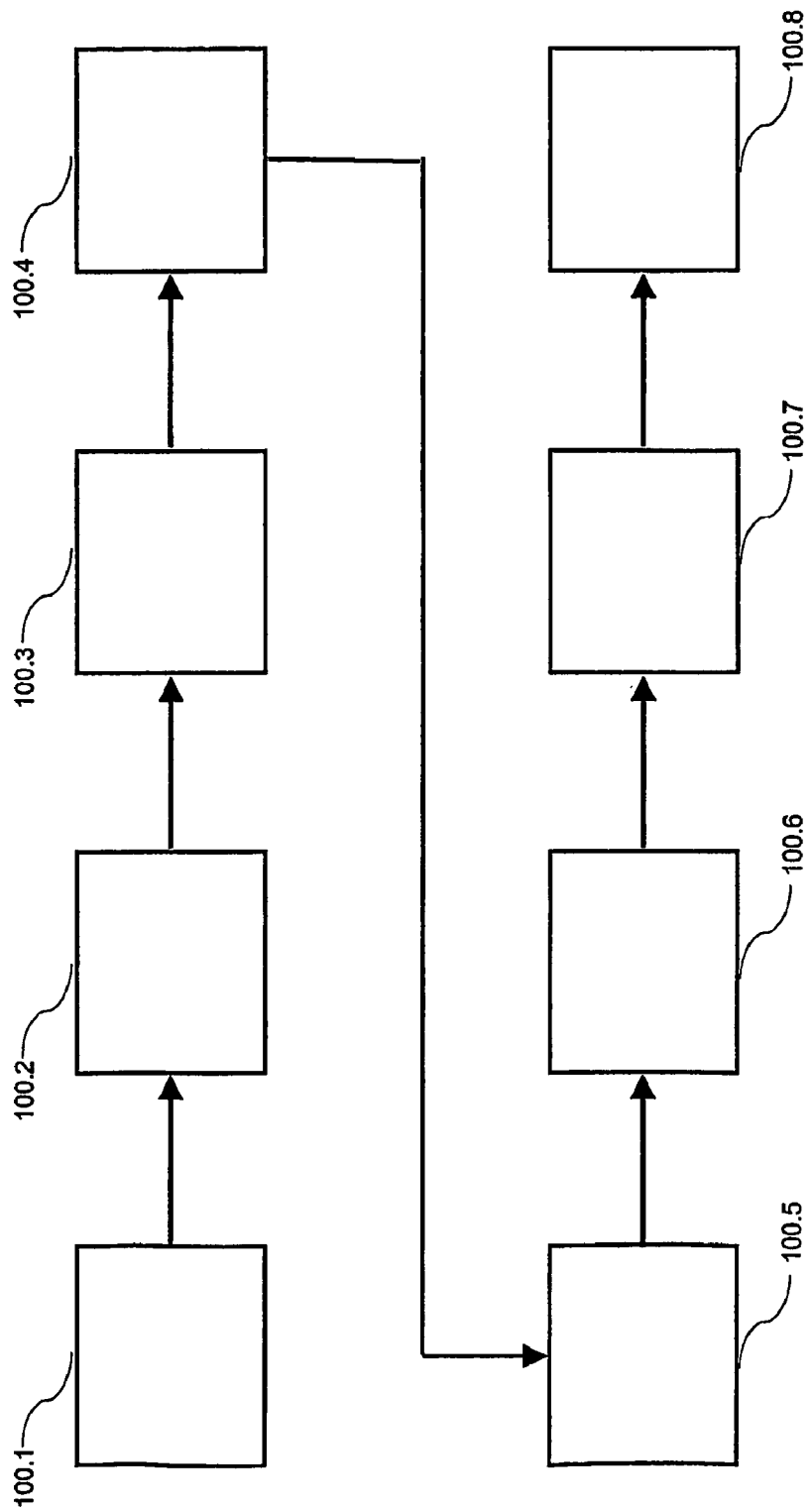
FIG. 1 shows the sequence of eight subprocesses of an exemplary production process.

The present invention will be explained using the example of a production process for manufacturing motor vehicles of a particular model, taking into account the following subprocesses of the production process, which are carried out successively in the order of the list:

vehicle scheduling, preliminary logistics 100.1: the preliminary steps required for production, for example, to inform and/or place orders with vendors, body assembly 100.2, surface 100.3, in particular paintwork, production logistics 100.4, especially taking into account times for transportation within the production facility, different working hours of the "trades", and arranging the products in the order in which they will be needed in subsequent subprocesses, interior assembly 100.5 as a subprocess including all assemblies into the interior of the car, such as the dashboard, seats, and trim, chassis 100.6 as a subprocess including all assemblies from below, such as the engine, drive train, axles, wheels, cables, breaking-in 100.7, including adjustments, for example, to the lighting system, breaks and chassis, completion of vehicle 100.8, including any rework required, and final ispection.

Vehicle scheduling and final inspection do not require any cycle times, and are therefore not taken into account below.

An order in which the n subprocesses of the production process are carried out is defined and is available to the inventive method and to the system as an input variable. The subprocesses are separated from each other in such a manner that no subprocesses are carried out in parallel or alternatively. Rather, the subprocesses are defined in such a way that branches occur only within one subprocess. No transition times occur between the subprocesses because transport and waiting times are taken into account in the subprocess "production logistics". Thus, there remain n=8 subprocesses 100.1 through 100.8. FIG. 1 illustrates the sequence of these eight subprocesses.

This definition is made, for example, using a simulation tool available on a data processing system. For each subprocess, one parameterizable simulation module is created, resulting in a total of n simulation modules. An arrow links a simulation module for one subprocess to the simulation module for the following subprocess.

A random sample is determined, the sample including actual cycle times which have been achieved in the past and have been measured in the real production process. The N sample elements of this random sample are preferably taken from N identical or similar technical products, for example, N motor vehicles of a model, which have been manufactured in the last nine months. The use of a random sample is a feature of the present invention which eliminates the need to use an analytic model. In the case of serial production, such a random sample is generally available anyway.

Each sample element includes the following information:

a unique identifier of the sample element and the cycle time through each subprocess; that is, in the exemplary embodiment, eight cycle times per sample element, the cycle times being specified in days or hours.

The breaks between two shifts, as well as downtimes, for example, due to weekends, holidays and/or during the night, are preferably deducted from the actual cycle times. This ensures that the time information in the sample elements is equivalent for all subprocesses.

Optionally, the sample element includes at least one of the following items of information:

an identifier of the variant of the technical product, which is the variant of the particular unit to which the sample element refers, beginning and end of the cycle through the respective subprocess, and the actual final inspection date for the unit.

Figure 2:
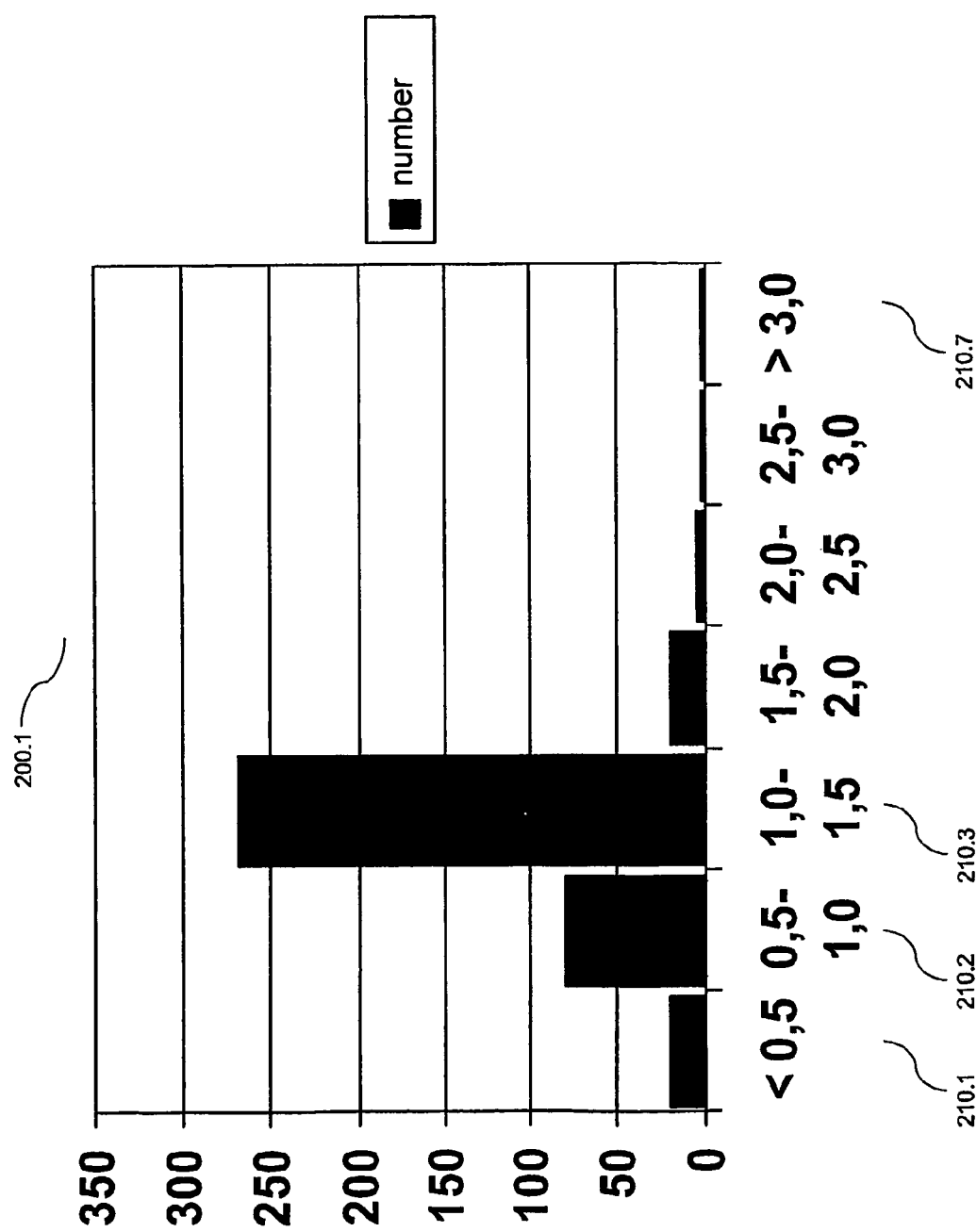
FIG. 2 shows an example of a histogram.

The cycle times through the n subprocesses 100.1, 100.2, . . . can be graphically illustrated by n histograms. To this end, the sample elements are grouped by cycle times for each subprocess. For example, all sample elements having a cycle time through the body assembly of less than 0.5 days are combined into a first group 210.1, all sample elements having a cycle time through the body assembly of between 0.5 days and 1 day are combined into a second group 210.2, and so on up to a group 210.7 for elements having a cycle time of 3 days or more, thus making a total of 7 groups. Therefore, in the exemplary embodiment, eight histograms can be created for the eight subprocesses. In the x-direction of the histogram, the groups are plotted in increasing order; in the y-direction, the number of sample elements of each group is represented, for example, by bars. The height of this bar illustrates the number of sample elements in the respective group. FIG. 2 shows, by way of example, a histogram for a subprocess. In this exemplar, 268 sample elements fall into the group 210.3 for 1.0 to 1.5 days.

The cycle time through the entire production process can also be represented by a histogram.

A histogram for the cycle time through a subprocess can be used to derive the degree of delivery reliability for the subprocess as a function of the planned cycle time through the subprocess or, vice versa, to derive the planned cycle time as a function of the degree of delivery reliability. In the first case, a decision rule is used, which decides when a simulation element is considered to be on time. The simplest embodiment of the decision rule is to assess a sample element as being on time if the actual cycle time through the subprocess is less than or equal to a planned cycle time. In a more complex embodiment, a random sample is still considered to be on time if it has too long a cycle time, but nevertheless has left the subprocess or the production process on the specified day. If, for a given planned cycle time, this decision rule is applied to each sample element, then the degree of delivery reliability is thereby determined for this planned cycle time. If the planned cycle time is varied, for example, between zero and the maximum actual cycle time through the subprocess, then the degree of delivery reliability is determined as a function of the planned cycle time. This function increases monotonously. By inversion, the planned cycle time is determined as a function of the degree of delivery reliability.

In the example of FIG. 2, the random sample includes N=398 elements. 368 of these have a maximum planned cycle time of 1.5 days, and 30 have a longer one. For a maximum planned cycle time of 1.5 days, the degree of delivery reliability is TTG=368/398*100%=92.46%. If the planned cycle time through this subprocess is increased to 3.0 days, then only 2 sample elements have too long a cycle time. Then, the degree of delivery reliability is TTG=396/398*100%=99.47%.

The simulation tool is capable of determining N cycle times through the entire production process for the N sample elements. To this end, the cycle times through the n subprocesses for the sample element are inserted into the n simulation modules, and a total cycle time is determined. Or, the n cycle times of a sample element are simply added to determine the total cycle time.

In a first step of the preferred embodiment, different combinations of cycle time limitations are created. Each combination includes at least one maximum cycle time, that is, an upper bound for the cycle time through a subprocess. Such a limitation may define maximum cycle times through various or even all of the n subprocesses. Different combinations may define different maximum cycle times for the same subprocess. As will be described below, an assessment is derived for each combination to determine which combination will have which effects on the degree of delivery reliability and the planned cycle time through the entire process.

In a procedure for deriving maximum cycle times for a subprocess (to be more precise: candidates to be examined for the maximum cycle time), the random sample including the actual cycle times through this subprocess is used. The random sample is used to determine, for different cycle times, in each case the proportion of sample elements of the entire random sample whose cycle times are less than or equal to the respective maximum cycle time, and which are therefore on time. For example, Table 1 below is determined for the subprocess 100.7 "breaking-in":

TABLE 1 cycle times through the subprocess 100.7 "breaking-in"

| Maximum cycle time [days] | Proportion of elements having a cycle time less than or equal to the maximum cycle time [%] |
| --- | --- |
| 10.0 | 100 |
| 5.0 | 98 |

TABLE 1-continued cycle times through the subprocess 100.7 "breaking-in"

| Maximum cycle time [days] | Proportion of elements having a cycle time less than or equal to the maximum cycle time [%] |
| --- | --- |
| 3.1 | 95 |
| 1.9 | 90 |
| 1.5 | 85 |
| 1.2 | 80 |

Interpretation of the last row: 80% of all sample elements have a cycle time through the subprocess of less than or equal to 1.2 days. If a maximum cycle time of 1.2 days is specified, and no changes are made to the production process, then only 80% of all sample elements are on time.

Conversely, it is also possible to specify different values for the proportion, such as 10%, 95%, . . . , 80%, and to determine in each case the minimum achievable maximum cycle time.

Individual or all rows of the table are selected, and the corresponding maximum cycle times (maximum cycle time, $1^{st}$ row) are used as upper bounds.

For example, when selecting different maximum cycle times to be examined, technical considerations must be made to determine which possible bounds can be achieved. This depends, inter alia, on the technical improvements that appear to be achievable, and on the technical devices available. An example of an improvement to the subprocess "body assembly" 100.2: By using additional measuring systems, surface defects are detected at an early point in time, namely already in subprocess "body assembly" 100.2, and not only in subsequent subprocesses, such as "surface" 100.3 or "interior assembly" 100.5, or even "completion of vehicle" 100.8. These improvement measures in the body assembly then reduce the rework required, and thus, the maximum cycle times in subsequent subprocesses. Possible improvements in subprocess "preliminary logistics" 100.1 are a higher availability in the vendor and purchasing process, changes in the procurement of materials, or in the product development process. Thus, for some possible improvements, different subprocesses have to be taken into account: Improvements in one subprocess result in shorter cycle times in subsequent subprocesses.

The second step determines for each combination which cycle time distribution through the entire production process will be produced by the maximum cycle time or the maximum cycle times of this combination if the actual cycle times for all units are successfully reduced to below the respective maximum cycle time. To this end, the given random sample is modified, and the modified sample elements are used to calculate cycle times through the production process. Five exemplary combinations define a maximum cycle time of 10 days, 3.1 days, 1.9 days, 1.4 days, or 1.2 days for the subprocess "breaking-in". For the other seven subprocesses, no maximum cycle times are defined by these five combinations.

Thus, one of these exemplary combinations limits the cycle time through the subprocess "breaking-in" to 1.5 days, without defining any maximum cycle times for the remaining subprocesses. To determine the effects of this combination on the cycle times through the production process, preferably, the following procedure is carried out: In all sample elements having a cycle time through the subprocess "breaking-in" of more than 1.5 days, the cycle time is fictitiously set to values which are determined by a random number generator and which are, for example, between 0.5 days and 1.5 days as the corridor for error- and delay-free passage through the subprocess. Or, the cycle times are reduced by the same reduction factor in all sample elements, so that all cycle times are below the bound. For example, the reduction factor is determined as the quotient of the maximum cycle time and the maximum actual cycle time of the sample elements through the selected subprocess. In both embodiments, the maximum cycle time is an upper bound for the cycle time through the subprocess; shorter cycles times are permissible. Or, the maximum cycle time is understood to be an exact input. In all sample elements having a cycle time through the subprocess, the cycle time is then fictitiously set to a value of exactly 1.5 days. The following consistently speaks of "maximum cycle time".

In place of a maximum cycle time, it is also possible to specify a reduction factor for the cycle time through a subprocess. After reducing all cycle times through the subprocess by this reduction factor, a maximum cycle time is obtained which is equal to the product of the reduction factor and the maximum actual cycle time of the sample elements through the subprocess. It is possible to specify a combination of reduction factors for a plurality of subprocesses.

Figure 3:
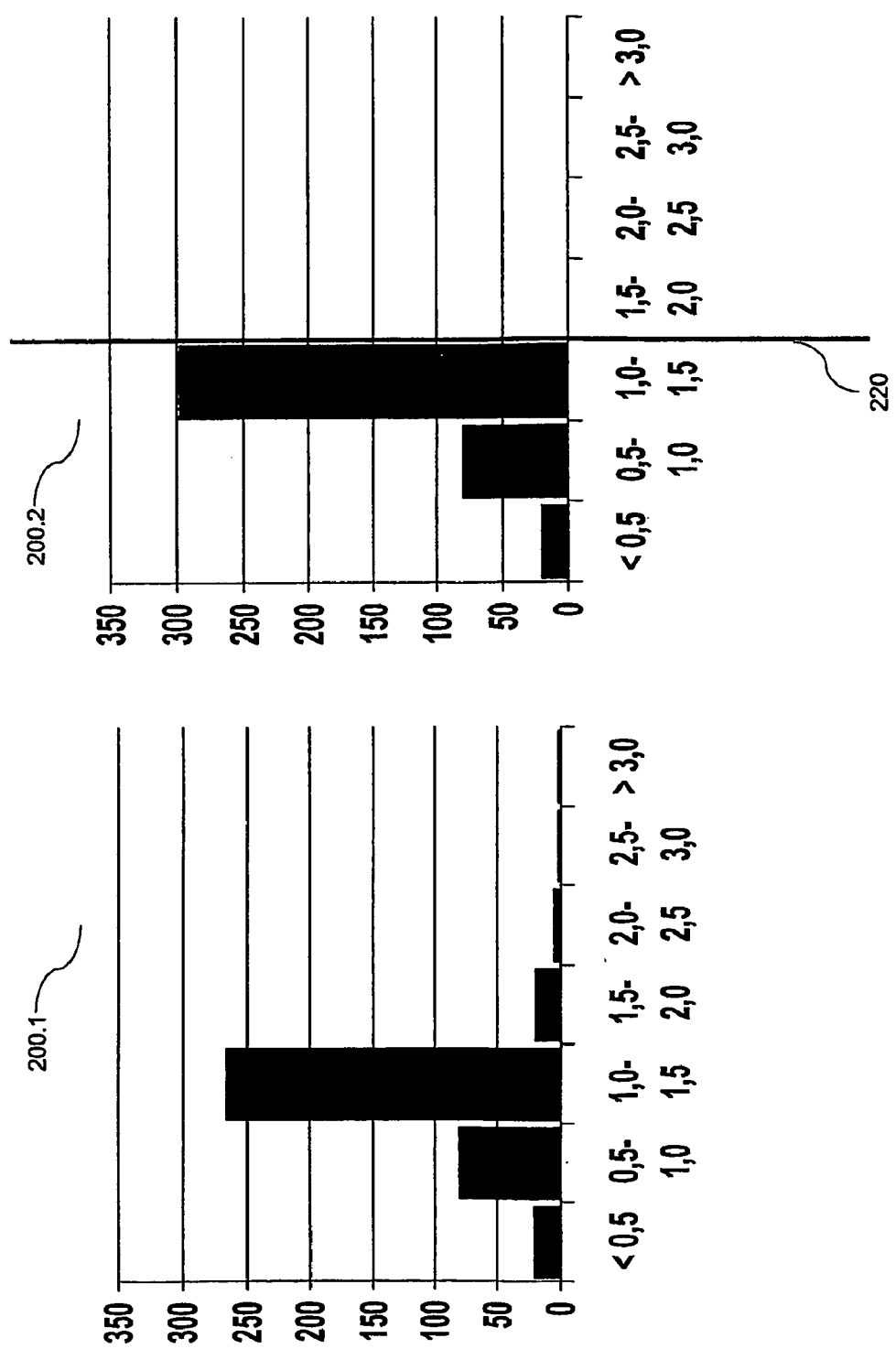
FIG. 3 shows a comparison of the histogram of FIG. 2 with a histogram containing reduced cycle times.

In the example of FIG. 3, the histogram 200.1 for the unchanged cycle times through the subprocess "breaking-in" 100.7 is shown on the left, and a histogram 200.2 for the cycle times that have been reduced to 1.5 days is shown on the right. This upper bound is shown by a bar 220. All sample elements are fictitiously given a cycle time of between 1.0 and 1.5 days.

Table 2 below indicates, by way of example, the maximum cycle times for the five combinations above, and in each case two values for the degree of delivery reliability (TTG).

TABLE 2 maximum cycle time and degree of delivery reliability (TTG) for five combinations with one cycle time bound each.

| Combination Name | Maximum cycle time [days] for "breaking-in" | Maximum cycle time [days] for the production process for TTG = 91% | Maximum cycle time [days] for the production process for TTG = 93% |
|---|---|---|---|
| comb_1 | 10 | 13.5 | 14.1 |
| comb_2 | 3.1 | 13.2 | 13.5 |
| comb_3 | 1.9 | 12.7 | 13.0 |
| comb_4 | 1.4 | 12.5 | 12.9 |
| comb_5 | 1.2 | 12.5 | 12.8 |

Interpretation: if the cycle time through the subprocess "breaking-in" 100.7 is limited to 1.2 days, then 91% of all sample elements achieve a cycle time of 12.5 days or less through the production process, and 93% achieve a cycle time of 12.8 days or less.

Table 3 below indicates, by way of example, the achieved planned cycle times through the production process as a function of two degrees of delivery reliability for five further combinations. Each of these five further combinations defines a first maximum cycle time for the subprocess "breaking-in" and a second maximum cycle time for the subprocess "surface", without defining any upper bounds for the six remaining subprocesses. Since the first maximum cycle time is the same as in Table 2, and because a second maximum cycle time is specified in each case, shorter planned cycle times through the production process are achieved.

TABLE 3 maximum cycle time and degree of delivery reliability (TTG) for five further combinations with two cycle time bounds each.

| Combination Name | Maximum cycle time [days] for "breaking-in" | Maximum cycle time [days] for "surface" | Planned cycle time [days] for TTG = 91% | Planned cycle time [days] for TTG = 93% |
|---|---|---|---|---|
| comb_6 | 10 | 10 | 13.5 | 14.1 |
| comb_7 | 3.1 | 2.8 | 13.1 | 13.4 |
| comb_8 | 1.9 | 2.2 | 12.5 | 12.7 |
| comb_9 | 1.4 | 2.0 | 12.2 | 12.4 |
| comb_10 | 1.2 | 1.8 | 12.0 | 12.3 |

Interpretation: if the cycle time through the subprocess "breaking-in" is limited to 1.2 days and the cycle time through the subprocess "surface" is limited to 1.8 days, then 91% of all sample elements achieve a cycle time of 12.0 or less, and 93% achieve a cycle time of 12.3 days or less. Consequently, if the planned cycle time through the production process is selected to be 12.0 or 12.3 days, then 91% or 93% of all units are completed on time, respectively.

For each combination, the achieved planned cycle time through the production process is determined as a function of the degree of delivery reliability, given compliance with the upper bounds of the combination. Therefore, for each combination, a function is obtained which can be represented in a diagram with the degree of delivery reliability on the x-axis and the planned cycle time on the y-axis. The greater the degree of delivery reliability for a given combination, the longer is the planned cycle time. This is because for a given combination and a given random sample, a greater degree of delivery reliability can only be achieved by considering a greater number of sample elements as being on time.

The planned cycle time is determined as a function of the specified degree of delivery reliability, as indicated above. This function increases monotonously, and can therefore be inverted.

Table 4 below shows four combinations of upper bounds for cycle times through subprocesses.

TABLE 4 four exemplary combinations

| Combination | Maximum cycle time through subprocesses [days] | | |
|---|---|---|---|
| | preliminary logistics | surface | breaking-in |
| comb_11 | ./. | ./. | 1.9 |
| comb_12 | 7.0 | ./. | 1.9 |
| comb_13 | 7.0 | 2.2 | 1.9 |
| comb_14 | ./. | ./. | ./. |

Combination comb_11 of Table 4 defines an upper bound only for the subprocess "breaking-in", but not for the remaining subprocesses. Combination comb_14 does not define any upper bound.

Table 5 below shows the achieved degrees of delivery reliability as a function of the planned cycle time for four combinations of Table 4.

TABLE 5 degrees of delivery reliability for the combinations of Table 4

| Max. cycle time | Comb_11 | Comb_12 | Comb_13 | Comb_14 |
|---|---|---|---|---|
| 12.0 | 76.5 | 80.8 | 83.4 | 74.1 |
| 12.5 | 84.4 | 88.4 | 90.7 | 80.2 |
| 13.0 | 88.9 | 92.5 | 94.4 | 84.3 |
| 13.5 | 91.7 | 94.9 | 96.2 | 87.6 |
| 14.0 | 93.3 | 96.2 | 97.3 | 89.7 |
| 14.5 | 94.5 | 97.2 | 98.0 | 91.3 |
| 15.0 | 95.4 | 97.8 | 98.4 | 92.6 |

Interpretation: for a planned cycle time through the production process of 12.0 days, the maximum cycle times of the combination comb_13 result in a degree of delivery reliability of 83.4% and, for a planned cycle time of 15 days, in a degree of delivery reliability of 98.4%. In other words: in comb_13, 83.4% of all sample elements achieve a cycle time of 12.0 days or less, and 98.4% achieve a cycle time of 15.0 days or less.

Figure 4:
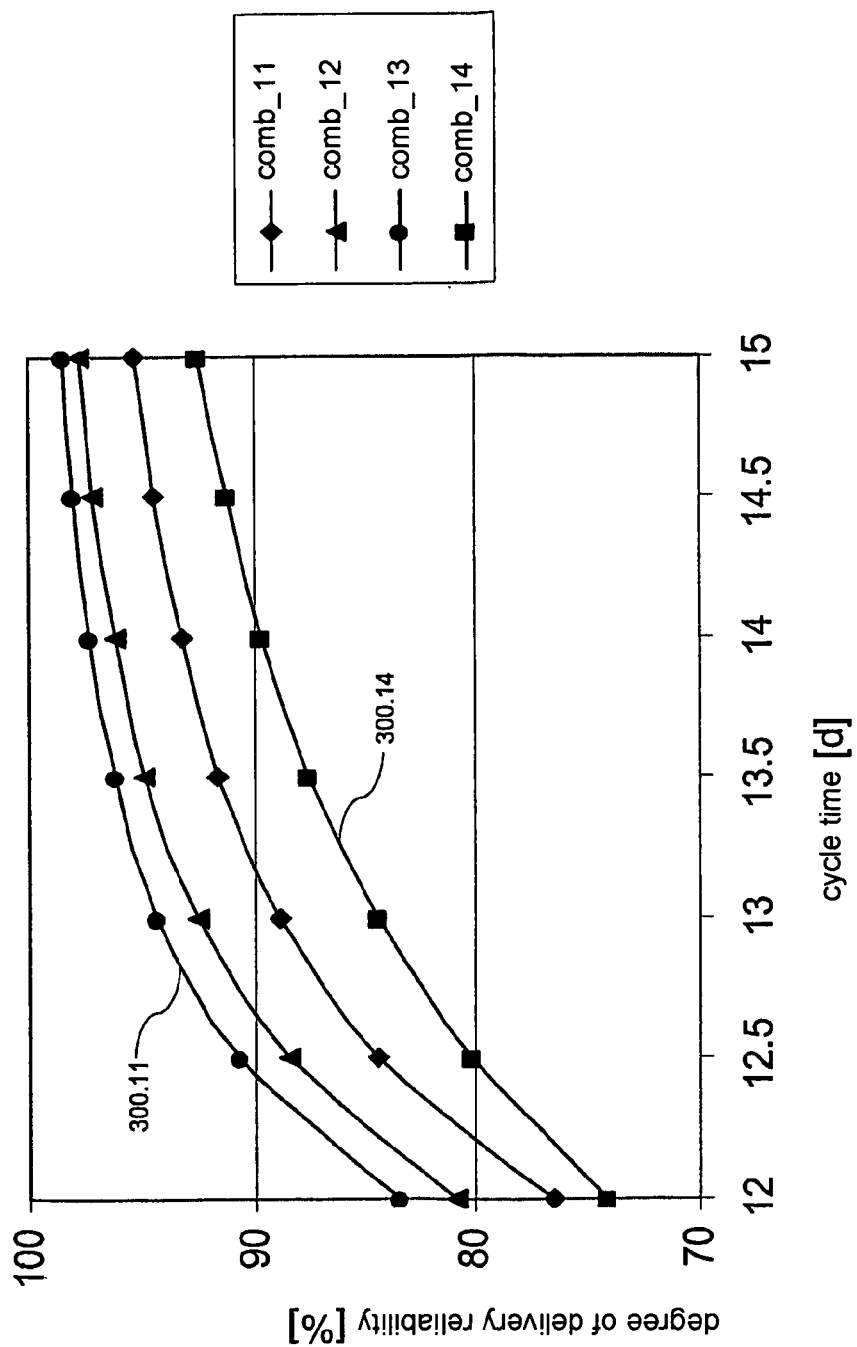
FIG. 4 shows the degree of delivery reliability as a function of the planned cycle time through the production process for four combinations of upper bounds for subprocesses.
Figure 5:
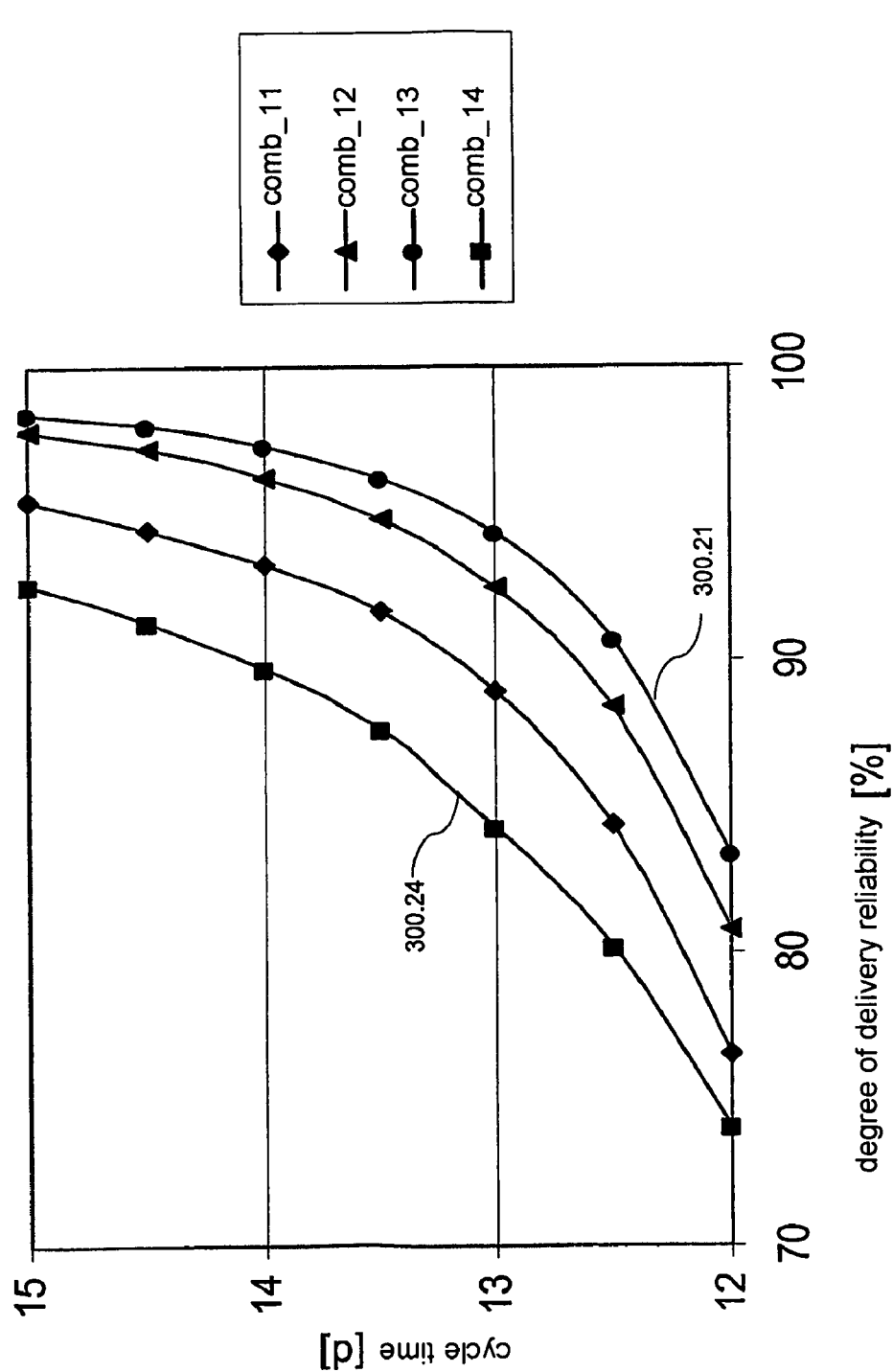
FIG. 5 shows the planned cycle time through the production process as a function of the degree of delivery reliability for four combinations of upper bounds for subprocesses.

FIG. 4 shows the four functions of Table 5 in an xy diagram with the planned cycle time in days DLZ[d] on the x-axis and the degree of delivery reliability in percent TTG[%] on the y-axis. Function 300.11 in FIG. 4 belongs to combination comb_11; function 300.14 belongs to combination comb_14. FIG. 5 shows the inverse functions, that is, in each case, the maximum planned cycle time as a function of the degree of delivery reliability. Function 300.21 in FIG. 5 belongs to combination comb_11; function 300.24 belongs to combination comb_14.

If each possible improvement, that is, each possible reduction of the cycle time through a subprocess by compliance with a maximum cycle time, is assigned a cost prediction, it is possible to predict which combination of maximum cycle times is associated with which costs. To this end, it is predicted which costs a possible combination is associated with. As a rule, it is sufficient to add up the respective cost predictions for the individual subprocesses.

In the third step, a combination of maximum cycle times is selected. The selected combination assigns to at least one subprocess a maximum cycle time, which is an upper bound for the cycle time through this subprocess which is to be met at all times. The selected combination may assign a maximum cycle time to each of a plurality of subprocesses. For this combination, the degree of delivery reliability as described above is present as a function of the planned cycle time through the production process.

The selection of a combination may be made by technical experts, preferably using a graphical representation of the effects of different combinations, for example, a graphical representation as shown in FIG. 4 or FIG. 5.

A different embodiment for selecting a combination will be described below. A planned cycle time through the production process is given. For each subprocess, the degree of delivery reliability of the production process is determined as a function of the percentage reduction of the maximum cycle time through the subprocess. In the sample elements, the cycle times through the subprocess that are greater than an upper bound are reduced, as has been described above. For 0% reduction, the degree of delivery reliability actually achieved by the random sample is entered.

TABLE 6 degree of delivery reliability as a function of the percentage reduction of the maximum cycle time

| Reduction of the maximum cycle time through the subprocess "breaking-in" [%] | Degree of delivery reliability for the production process [%] |
|---|---|
| 0 | 70.0 |
| 10 | 86.0 |
| 20 | 91.0 |
| 30 | 93.5 |
| 40 | 95.0 |
| 50 | 96.1 |

Interpretation: in the present random sample, a degree of delivery reliability of 70.0% is achieved. If the maximum cycle time through the subprocess "breaking-in" is reduced by 30%, then the degree of delivery reliability increases to 93.5%. The degree of delivery reliability as a function of the percentage reduction is an increasing function and typically goes into saturation. Reduction of the maximum cycle time beyond a saturation point produces only a slight increase in the degree of delivery reliability. The function is represented as a curve, and an operating point is selected on this curve, for example, the operating point with a slope of 45 degrees. Measures producing a reduction of the maximum cycle time to a value less than the x-value of the selected operating point often have a short effect and primarily eliminate outliers. A reduction of the maximum cycle time to a value greater than the x-value typically requires strategic measures.

For n subprocesses, n functions are determined and n operating points are defined. Thus, n upper bounds are assigned for the n subprocesses.

Moreover, the expected costs that may be associated with the achievement of an improvement for a subprocess may be stored. Thus, costs may have been defined for different maximum cycle times, and thus, for different combinations. Furthermore, different values for the degree of delivery reliability may be provided with assessments for the benefit to be expected in each case. In each instance one benefit-cost ratio is calculated for different combinations; these are compared with each other. Preferably, the combination having the optimal benefit-cost ratio is selected.

Figure 6:
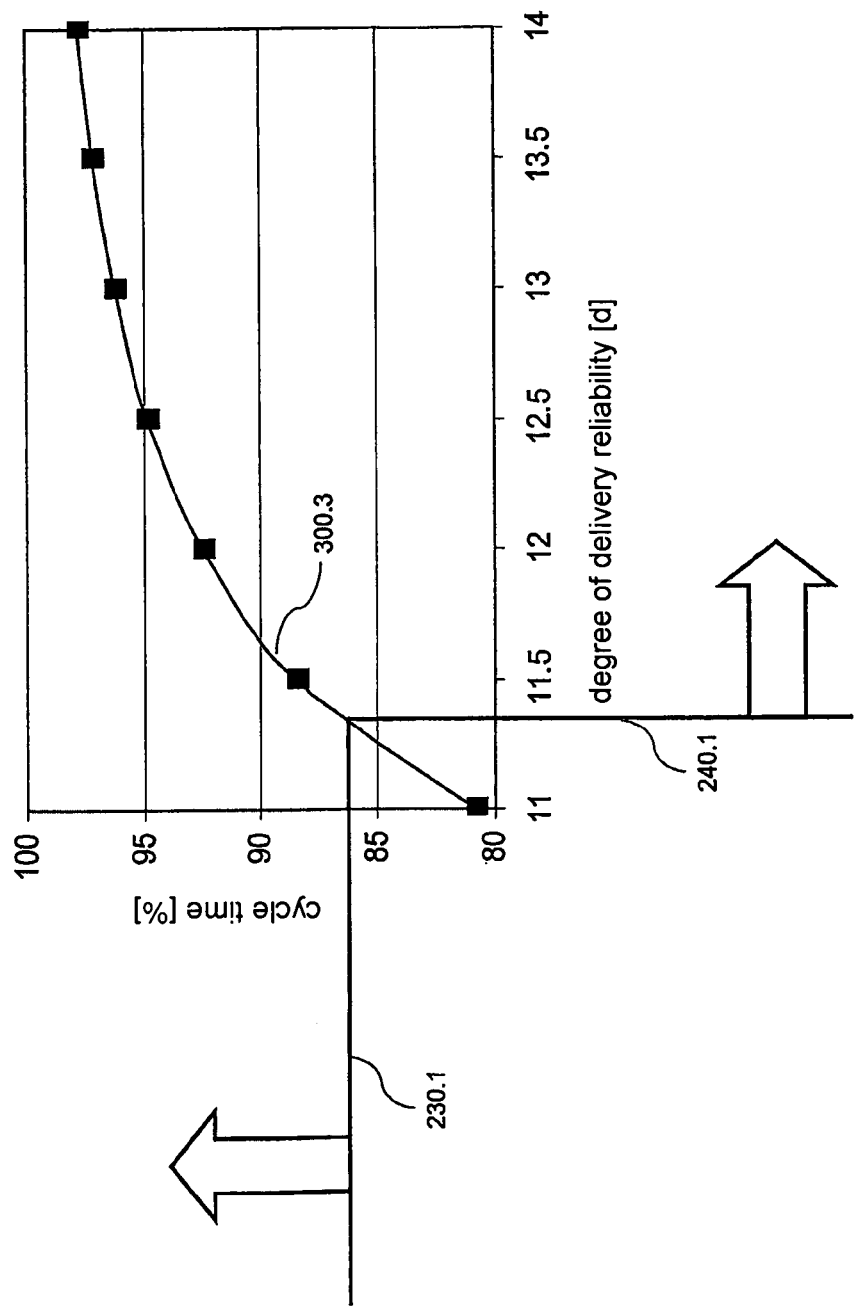
FIG. 6 shows the degree of delivery reliability in percent as a function of the planned cycle time in days through the production process.
Figure 7:
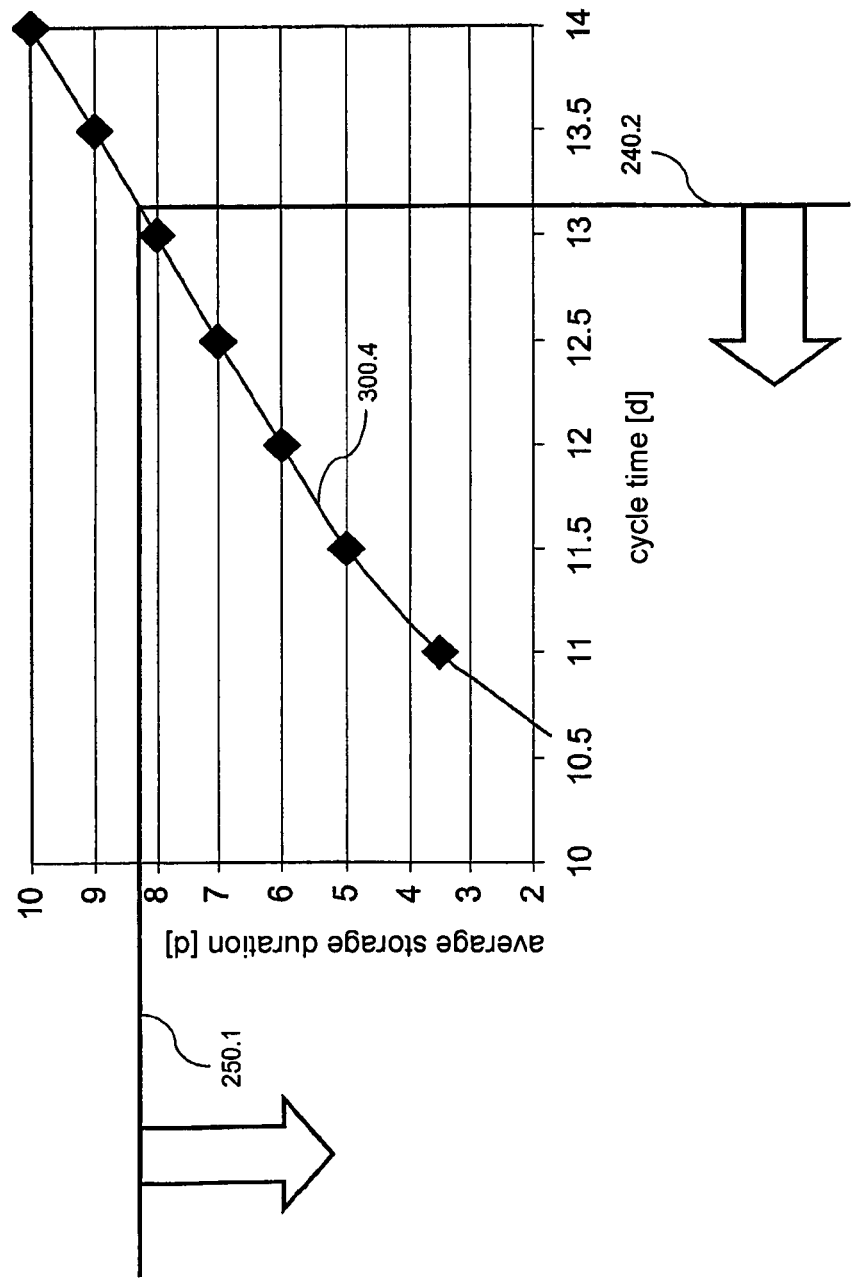
FIG. 7 shows the average storage duration in days as a function of the planned cycle time in days through the production process.

In the fourth step, the degree of delivery reliability in percent and the average storage duration expressed, for example, in days are each determined as a function of the planned cycle time through the production process for the selected combination of limitations. By varying the planned cycle time, the average storage duration is determined as a function of the planned cycle time. Typically, this function is nearly linear over wide ranges and approximately parabolic for short cycle times. FIG. 6 shows, by way of example, the function for the degree of delivery reliability and for the selected combination, namely the curve 300.3. FIG. 7 shows, by way of example, the function for the storage duration and for the selected combination, namely the curve 300.4.

To this end, preferably, the following steps are carried out:
The cycle time distribution produced by the selected combination of limitations is selected as described above. The average cycle time of all sample elements is determined, taking into account also sample elements having too long a cycle time. The planned cycle time is determined from this average cycle time as described above.

e difference between the planned cycle time and the average cycle time of all sample elements is equal to the average storage duration. This is because an order is, on average, completed already after the average cycle time, but delivered only after the planned cycle time. The order must be intermediately stored for the duration of this difference. Note: orders that are not on time need not be stored intermediately, but can be delivered immediately.

The inventory, which, as described above, constitutes bound capital, is determined from the storage duration. In a car manufacturing environment, this inventory is often referred to as "yard inventory". The daily production is considered to be constant for simplification. Therefore, the inventory measured in units of the product is equal to the product of the daily production and the average storage duration in days. The production rate and the storage duration may also be referred to another reference time period. It is also possible to determine the production rate as a function of the storage duration from random samples, and to use this function in place of a constant daily production.

For the selected combination, as described above, the degree of delivery reliability is present as a function of the planned cycle time through the production process. In the fifth step, an operating point is selected on this function. When represented as a curve, this function increases monotonously and typically goes quickly into saturation as the planned cycle time increases. Preferably, the following procedure is carried out: For the inventory in units, an upper bound is defined, which is derived, for example, from an upper limit for the bound capital and/or the available storage space. This upper bound is divided by the daily production to derive an upper bound for the storage duration. In the example of FIG. 7, this upper bound is indicated by horizontal bar 250. Using the function that indicates the storage duration as a function of the planned cycle time, an upper bound is derived for the planned cycle time. The planned cycle time producing the maximum permitted storage duration is preferably selected as the upper bound. In the example of FIG. 7, the maximum permitted storage duration is indicated by vertical bar 240.2.

Moreover, a lower bound is specified for the degree of delivery reliability, for example, because of sales or quality assurance requirements. Using the function that indicates the degree of delivery reliability as a function of the planned cycle time, a lower bound is derived for the planned cycle time. In the example of FIG. 6, the lower bound defined for the degree of delivery reliability is indicated by horizontal bar 230, and the lower bound derived for the planned cycle time is indicated by vertical bar 240.1.

An operating point is defined on this function. The x-value of this operating point yields a planned cycle time; the y-value yields the degree of delivery reliability that is achieved when the maximum cycle times through subprocesses defined by the selected combination are met at all times. The operating point is selected such that its x-value is between the lower and upper bounds. It is preferred to select the point where the curve has a slope of 45 degrees. At this operating point, the production process responds most effectively to reductions of the cycle times through subprocesses by means of measures.

Figure 8:
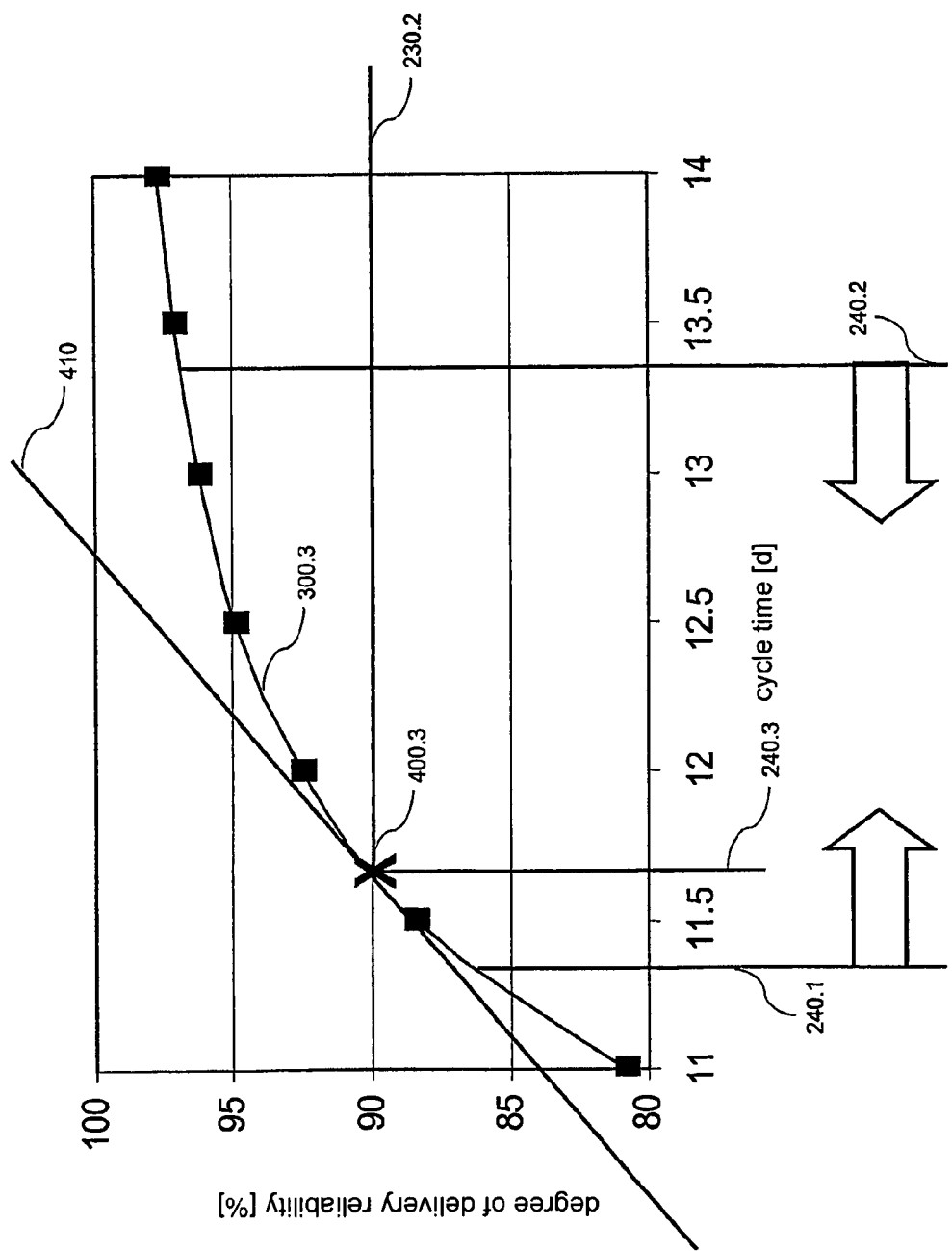
FIG. 8 shows the selection of an operating point on the function of FIG. 6.

FIG. 8 shows, by way of example, this procedure in the selection of an operating point on function 300.3. Operating point 400 is selected, because line 410 has a slope of 45 degrees. The planned cycle time 240.3 belonging to this operating point is between lower bound 240.1 and upper bound 240.2.

If the operating point so determined would result in a planned cycle time of less than the lower bound or greater than the upper bound, then the lower or upper bound is selected as the planned cycle time.

Figure 9:
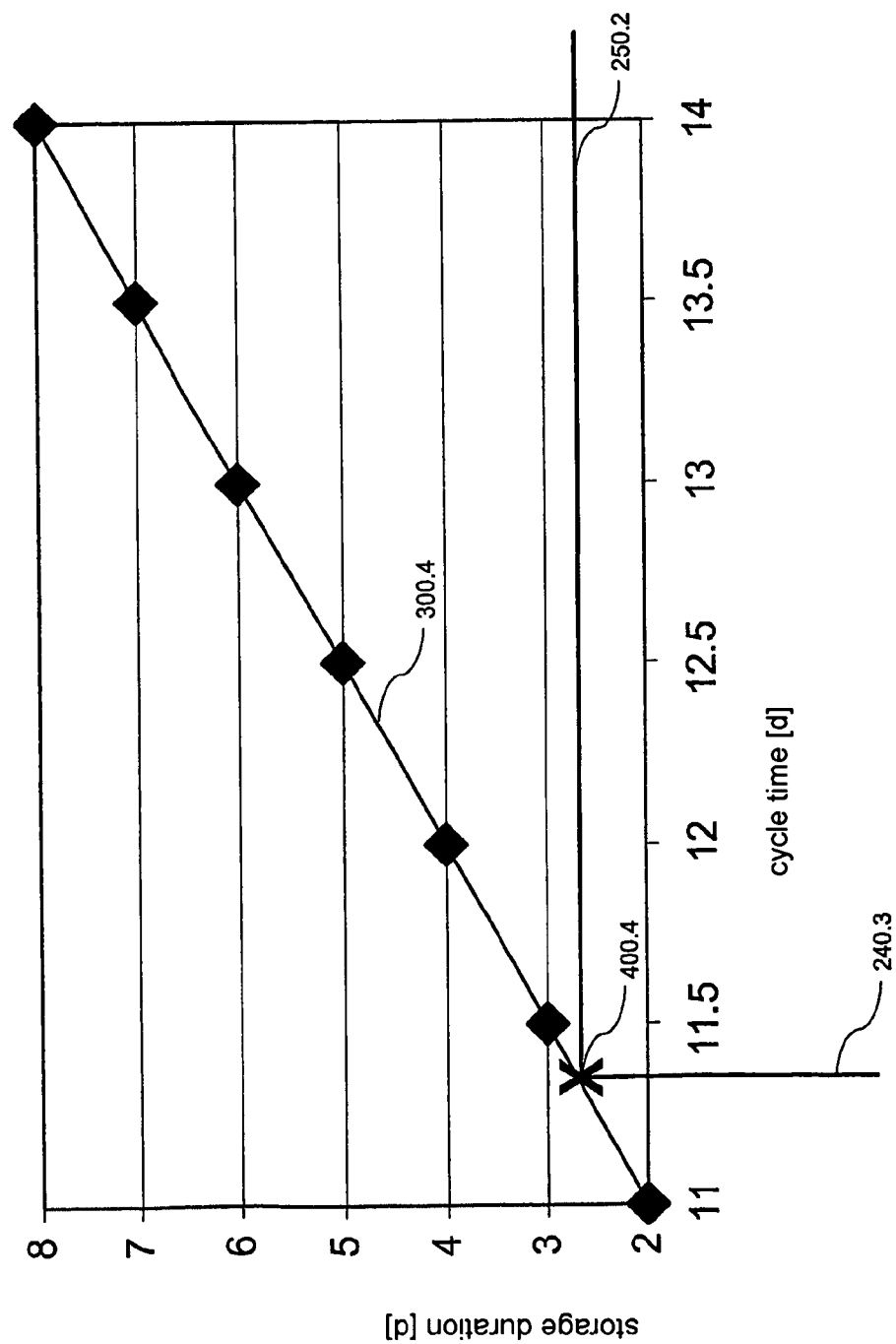
FIG. 9 shows the operating point selected in FIG. 8 on the function of FIG. 7.
Figure 10:
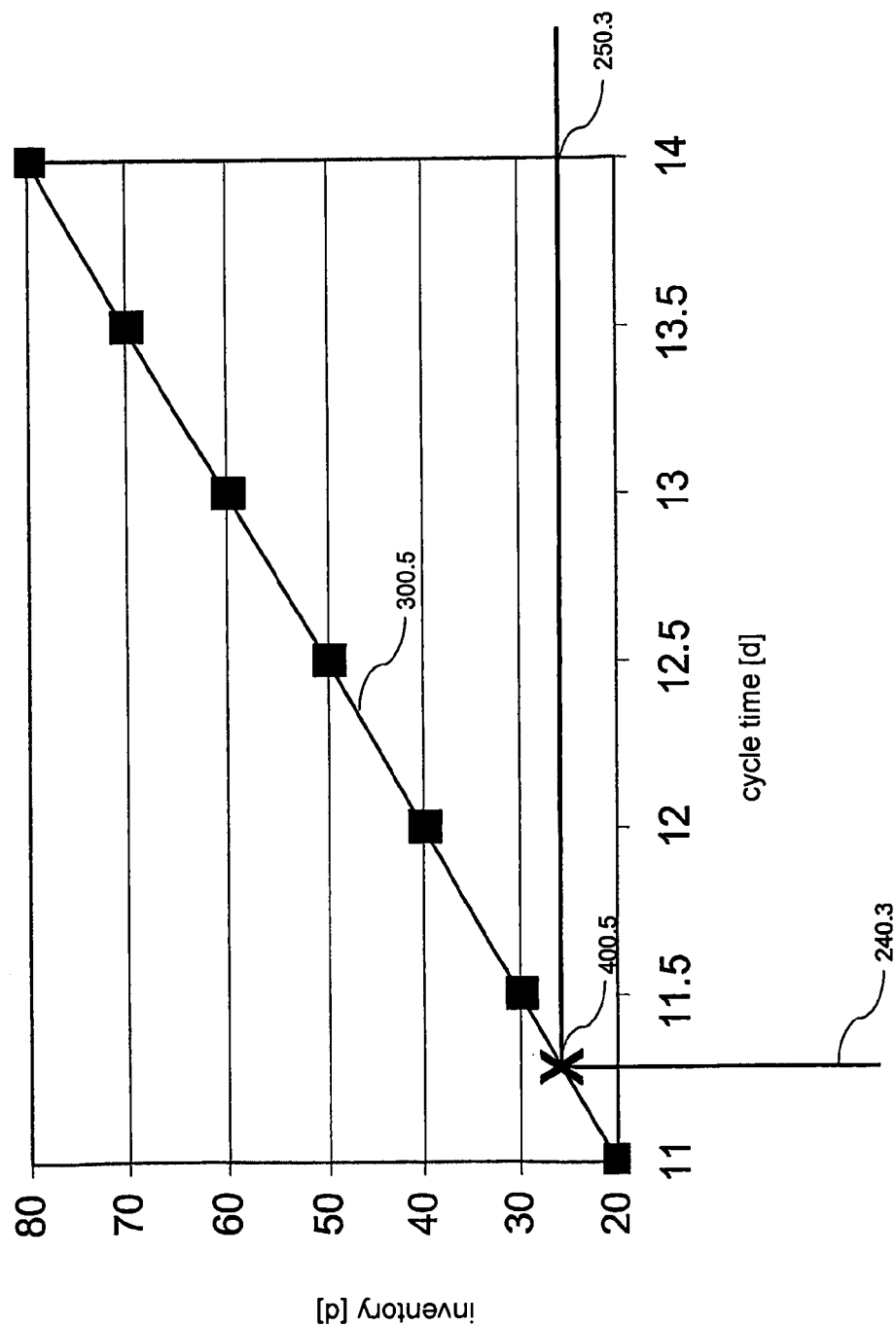
FIG. 10 shows the operating point selected in FIG. 8 on the average inventory as a function of the planned cycle time.

FIG. 8 shows the degree of delivery reliability as a function 300.3 of the planned cycle time, as well as the determined working point 400.3 and the achieved degree of delivery reliability 230.2. FIG. 9 shows the average storage duration (LZ) in days as a function 300.4 of the planned cycle time (DLZ), as well as the determined operating point 400.4 and the achieved storage duration 250.2. FIG. 10 shows the average inventory as a function 300.5 of the planned cycle time, as well as the determined working point 400.5 and the achieved inventory (LB) 250.3.

In one preferred embodiment, the degree of delivery reliability, the average storage duration, and the average inventory are determined as functions of a safety margin added to the average cycle time through the production process. This safety margin is the difference between the planned cycle time and the average cycle time through the production process of all sample elements, including those having too long a cycle time. The average cycle time depends on the particular combination, but not on the variable planned cycle time. This safety margin is the new independent variable. Only planned cycle times greater than the average cycle are taken into account for this purpose. The above-described procedure is modified accordingly, and a safety margin is selected in place of a planned cycle time.

On the whole, this embodiment of the inventive method yields the following quality parameters of the production process in a systematic and comprehensible way:
  in each case a maximum cycle time through one or more subprocesses of the production process,
  in each case an achieved degree of delivery reliability for each subprocess,
  a cycle time distribution through the production process and a planned cycle time,
  the achieved degree of delivery reliability of the entire production process,
  the average storage duration, for example, in days
  and the average inventory in units.

In summary, the present invention relates to a method, a device arrangement, and a computer program product for determining effects that cycle time limitations for subprocesses of a production process have on quality parameters of the production process. The device arrangement can comprise, for example, a computer having an internal memory. A limitation of the planned cycle time is specified for at least one subprocess of a serial production process. Also specified is a planned cycle time through the entire production process. The present invention teaches how two production process parameters resulting from the cycle time limitation for the at least one subprocess are automatically determined using a random sample: the degree of delivery reliability (TTG) and the average storage duration. Given a constant throughput, the latter is proportional to the average inventory of finished products. The method may be used in particular to test the effects of different cycle time limitations for different subprocesses in advance.

List of Reference Symbols

| Symbol | Meaning |
| --- | --- |
| 100.1, 100.2, . . . | Subprocesses |
| 100.1 | subprocess "preliminary logistics" |
| 100.2 | subprocess "body assembly" |
| 100.3 | subprocess "surface" |
| 100.4 | subprocess "production logistics" |
| 100.5 | subprocess "interior assembly" |
| 100.6 | subprocess "chassis" |

-continued

| Symbol | Meaning |
| --- | --- |
| 100.7 | subprocess "breaking-in" |
| 100.8 | subprocess "completion of vehicle" |
| 200.1, 200.2, . . . | histograms for cycle times |
| 210.1, 210.2, . . . | groups for the histograms |
| 220 | maximum cycle time through a subprocess |
| 230.1 | lower bound for the degree of delivery reliability |
| 230.2 | degree of delivery reliability resulting from the operating point on function 300.3 |
| 240.1 | lower bound for a safety margin in days |
| 240.2 | upper bound for a safety margin in days |
| 240.3 | safety margin of the selected operating point on function 300.3 |
| 250.1 | upper bound for an average storage duration in days |
| 250.2 | average storage duration in days resulting from the operating point |
| 300.11, . . . , 300.14 | degree of delivery reliability as a function of the planned cycle time through the production process for the combinations comb__11, . . . , comb__14 |
| 300.21, . . . , 300.24 | planned cycle time through the production process as a function of the degree of delivery reliability for the combinations comb__11, . . . , comb__14 |
| 300.3 | degree of delivery reliability as a function of the safety margin for a selected combination |
| 300.4 | average storage duration as a function of the safety margin for a selected combination |
| 300.5 | average inventory as a function of the safety margin for a selected combination |
| 400.3 | selected operating point on function 300.3 |
| 400.4 | resulting operating point on function 300.4 |
| 400.5 | resulting operating point on function 300.5 |
| comb__11, comb__12, . . . | combinations of maximum cycle times through subprocesses |

What is claimed is:

1. A method for determining effects of cycle time limitations for sub-processes of a production process for individual units of a technical product, in which are set: a pre-selected definition of the order of sequence in which the sub-processes of the production process are carried out, a pre-selected planned cycle time through the production process, a pre-selected random sample including individual sample elements of units processed in the production process, each one of the individual sample elements including information on actual cycle times of the corresponding unit through the sub-processes, and a pre-selected maximum cycle time through a pre-selected one of the sub-processes, the method comprising the steps of:
   for all individual sample elements, replacing the actual corresponding cycle times through the pre-selected one of the sub-processes with pre-selected reduced cycle times set to be equal to or less than the pre-selected maximum cycle time for the pre-selected one of the sub-processes,
   determining cycle times through the production process, which result from the reduction, for the random sample, using
      the reduced cycle times for the individual sample elements of the random sample through the pre-selected one of the sub-processes,
      the actual cycle times of the individual sample elements of the random sample through the remaining sub-processes, and
      the order of sequence,
   determining a degree of delivery reliability of the production process as a proportion of sample elements of the random sample having cycle times that are less than or equal to the planned cycle time through the production process.

2. The method of claim 1, comprising the further steps of:
   determining a degree of delivery reliability function to indicate the degree of delivery reliability as a function of the planned cycle time; and
   determining a planned cycle time and a degree of delivery reliability by selecting an operating point of the degree of delivery reliability function.

3. The method of claim 2, comprising the further step of selecting a point at which a slope of a curve of the degree of delivery reliability function is approximately 45 degrees as the operating point.

4. The method of claim 1, comprising the further steps of:
   specifying a lower bound for the degree of delivery reliability of the production process,
   performing the method steps of claim 1 at each of different pre-selected planned cycle times, and
   determining the planned cycle times resulting in degrees of delivery reliability greater than or equal to the lower bound.

5. The method of claim 4 comprising the further steps of:
   determining an average of the cycle times through the production process,
   determining an average storage duration as the difference between the pre-selected planned cycle time and the average cycle time through the production process.

6. The method of claim 5, comprising the further steps of:
   specifying an average number of units of the technical product which are to be produced by the production process, and
   determining an average inventory of units as a function of the average number to be produced and the determined average storage duration.

7. The method of claim 6, comprising the further steps of:
   determining a storage duration function indicating the average storage duration as a function of the pre-selected planned cycle time;
   repeating the method of claim 6 at different pre-selected planned cycle times during the determination of the previous step.

8. The method of claim 6, comprising the further steps of:
   determining an inventory function to indicate an average inventory as a function of the pre-selected planned cycle time;
   repeating the method of claim 6 at different pre-selected planned cycle times during the determination of the previous step.

9. The method of claim 7, comprising the further steps of:
   specifying an upper bound for an average storage duration, and
   varying the pre-selected planned cycle time, to determine planned cycle times resulting in storage durations of less than or equal to the upper bound.

10. The method of claim 1, comprising the further steps of:
    determining a reduction factor of less than 1 for the cycle time through the pre-selected sub-process; and
    determining reduced cycle times as the product of the reduction factor and the actual cycle times of sample elements through the pre-selected sub-process.

11. The method of claim 1, comprising the further steps of:
    specifying a reduction factor of less than 1 for the cycle time through the pre-selected sub-process; and
    determining a maximum cycle time as the product of the reduction factor and the maximum actual cycle time through the pre-selected sub-process among the sample elements.

12. A device arrangement for determining effects of cycle time limitations for sub-processes of a repeatable production process for individual units of a technical product, which comprises:
a first device for defining an order of sequence in which sub-processes of the production process are carried out,
a second device for defining a planned cycle time through the production process,
a third device for defining a maximum cycle time through at least one first sub-process,
a fourth device for determining a random sample for the production process, the random sample including a cycle time through each sub-process for each sample element of the random sample,
a fifth device for reducing the cycle times through the first sub-process in all sample elements to a value less than or equal to the maximum cycle time for the first sub-process,
a sixth device for determining cycle times through the production process for the random sample, using the reduced cycle times for the first sub-process, the actual cycle times for the remaining sub-processes, and the order of sequence, and
a seventh device for determining a degree of delivery reliability as a proportion of sample elements of the entire random sample whose cycle times are less than or equal to the planned cycle time through the production process.

13. The device of claim 12, further comprising:
an eighth device for determining an average cycle time through the production process, and
a ninth device for determining an average storage duration as a difference between the planned cycle time and the average cycle time.

14. The device of claim 12, further comprising:
a tenth device for determining, by varying the planned cycle time, a degree of delivery reliability function to indicate a degree of delivery reliability as a function of the planned cycle time, and
an eleventh device for generating a graphical representation of the degree of delivery reliability function.

15. The device of claim 14, further comprising:
a twelfth device for defining a plurality of combinations of maximum cycle times for sub-processes; each combination including at least one upper bound for the cycle time through a sub-process, and
a fourteenth device for generating a graphical representation of the degree of delivery reliability function for each defined combination.

16. The device of claim 15, further comprising:
a fifteenth device for determining, by varying the planned cycle time, a storage duration function for each defined combination, the storage duration function indicating the average storage duration as a function of the planned cycle time for a corresponding combination, and
a sixteenth device for generating a graphical representation of the storage duration function for the combinations.

17. A computer program product arranged and configured to be loaded into an internal memory of a computer and which includes software segments for implementing, when the product is running on the computer, a method for determining effects of cycle time limitations for sub-processes of a production process for individual units of a technical product, in which are set: a pre-selected definition of the order of sequence in which the sub-processes of the production process are carried out, a pre-selected planned cycle time through the production process, a pre-selected random sample including individual sample elements of units processed in the production process, each one of the individual sample elements including information on actual cycle times of the corresponding unit through the sub-processes, and a pre-selected maximum cycle time through a pre-selected one of the sub-processes, the method comprising the steps of:
for all individual sample elements, replacing the actual corresponding cycle times through the pre-selected one of the sub-processes with pre-selected reduced cycle times set to be equal to or less than the pre-selected maximum cycle time for the pre-selected one of the sub-processes,
determining cycle times through the production process, which result from the reduction, for the random sample, using
the reduced cycle times for the individual sample elements of the random sample through the pre-selected one of the sub-processes,
the actual cycle times of the individual sample elements of the random sample through the remaining sub-processes, and
the order of sequence,
determining a degree of delivery reliability of the production process as a proportion of sample elements of the random sample having cycle times that are less than or equal to the planned cycle time through the production process.

18. A computer program product stored on a computer-readable medium and including a computer readable program arranged and configured to cause a computer to execute a method for determining effects of cycle time limitations for sub-processes of a production process for individual units of a technical product, in which are set: a pre-selected definition of the order of sequence in which the sub-processes of the production process are carried out, a pre-selected planned cycle time through the production process, a pre-selected random sample including individual sample elements of units processed in the production process, each one of the individual sample elements including information on actual cycle times of the corresponding unit through the sub-processes, and a pre-selected maximum cycle time through a pre-selected one of the sub-processes, the method comprising the steps of:
for all individual sample elements, replacing the actual corresponding cycle times through the pre-selected one of the sub-processes with pre-selected reduced cycle times set to be equal to or less than the pre-selected maximum cycle time for the pre-selected one of the sub-processes,
determining cycle times through the production process, which result from the reduction, for the random sample, using
the reduced cycle times for the individual sample elements of the random sample through the pre-selected one of the sub-processes,
the actual cycle times of the individual sample elements of the random sample through the remaining sub-processes, and
the order of sequence,
determining a degree of delivery reliability of the production process as a proportion of sample elements of the random sample having cycle times that are less than or equal to the planned cycle time through the production process.

* * * * *

UNITED STATES PATENT AND TRADEMARK OFFICE
CERTIFICATE OF CORRECTION

| | | |
|---|---|---|
| PATENT NO. | : 7,039,484 B2 | Page 1 of 1 |
| APPLICATION NO. | : 10/532890 | |
| DATED | : May 2, 2006 | |
| INVENTOR(S) | : Martin Daferner | |

It is certified that error appears in the above-identified patent and that said Letters Patent is hereby corrected as shown below:

On the title page, under the heading OTHER PUBLICATIONS, Column 2, "stochastic Perti nets" should be changed to --stochastic Petri nets--;

column 2, line 49, "The invention provides" should be changed to --the present invention provides--;

column 5, line 61, "final ispection" should be changed to --final inspection--;

column 13, line 1 "e difference" should be changed to --the difference--.

Signed and Sealed this

Twenty-fourth Day of April, 2007

JON W. DUDAS
*Director of the United States Patent and Trademark Office*